United States Patent [19]

Kawasaki et al.

[11] 4,219,576
[45] Aug. 26, 1980

[54] METHOD OF MANUFACTURING A SIMULATED CORNED BEEF PRODUCT

[75] Inventors: Yōichi Kawasaki; Hitoshi Taniguchi; Yukiomi Yamato, all of Sennan; Kyoko Minamiyama, Sakai, all of Japan

[73] Assignee: Fuji Oil Company, Limited, Osaka, Japan

[21] Appl. No.: 24,043

[22] Filed: Mar. 26, 1979

Related U.S. Application Data

[63] Continuation of Ser. No. 838,970, Oct. 3, 1977, abandoned.

[30] Foreign Application Priority Data

Oct. 5, 1976 [JP] Japan ................................ 51/120118

[51] Int. Cl.$^2$ ............................ A23J 3/00; A23L 1/27
[52] U.S. Cl. ..................................... 426/262; 426/407; 426/412; 426/413; 426/516; 426/517; 426/521; 426/602; 426/608; 426/656; 426/802
[58] Field of Search ............... 426/250, 262, 264, 602, 426/608, 611, 613, 641, 645, 646, 647, 650, 652, 654, 656, 397, 407, 410, 412, 413, 417, 506, 507, 511, 513, 516, 517, 519, 520, 521, 523, 802, 104, 657, 276; 264/202

[56] References Cited

U.S. PATENT DOCUMENTS

| | | | |
|---|---|---|---|
| 2,730,447 | 1/1956 | Boyer | 426/250 |
| 3,320,070 | 5/1967 | Hartman | 426/104 |
| 3,488,770 | 1/1970 | Atkinson | 426/104 |
| 3,662,671 | 5/1972 | Frederiksen et al. | 426/656 |
| 3,662,672 | 5/1972 | Hoer | 426/656 |
| 3,840,677 | 10/1974 | Leidy et al. | 426/802 X |
| 3,898,345 | 8/1975 | Horrocks et al. | 426/802 X |
| 3,956,514 | 5/1976 | Sternberg et al. | 426/276 |
| 3,982,004 | 9/1976 | Obata et al. | 426/641 |
| 3,988,485 | 10/1976 | Hibbert et al. | 426/802 X |
| 4,000,323 | 12/1976 | Youngquist | 426/802 X |
| 4,001,441 | 1/1977 | Liepa | 426/802 X |

FOREIGN PATENT DOCUMENTS 52-3852  1/1977  Japan .

OTHER PUBLICATIONS

Jacobs, "The Chemistry & Technology of Food & Food Products", 1951, pp. 36–37.

Primary Examiner—Arthur L. Corbin
Attorney, Agent, or Firm—Wenderoth, Lind & Ponack

[57] ABSTRACT

A method of manufacturing a simulated corned beef product which utilizes fibrillated protein fibers obtained by heating a slurry of proteinaceous material under a high pressure to produce elongated tender protein filaments or fibers and extruding the slurry through an orifice to remove the tender protein filaments or fibers from the protein slurry. The fibrillated protein fibers are mixed with an emulsion containing a seasoning agent, a flavoring agent, a spice and a coloring agent. The emulsion is prepared from fat and oil and a proteinaceous material. To the mixture of the fibrillated protein fibers and the emulsion, loosened texture fibers of a livestock meat may be added.

3 Claims, No Drawings

METHOD OF MANUFACTURING A SIMULATED CORNED BEEF PRODUCT

This is a continuation of application Ser. No. 838,970, filed Oct. 3, 1977, now abandoned.

BACKGROUND OF THE INVENTION

The present invention relates to a method of manufacturing a simulated corned beef.

A corned beef, commercially available in Japan and some countries in the world, and distinct from a simulated corned beef to which the present invention pertains, is often manufactured from a mixture of beef, pork, lamb and horse meat. Prior to these livestock meats being mixed and filled in a casing such as a can or any suitable container with seasoning and fatty substances added, they are, after having been treated by curing and boiling, loosened by the use of a pressure-applying roll or a mixer to provide isolated texture fibers. This may be considered distinct from a genuine corned beef which is manufactured by packing into a can a lump of cured and boiled beef, neither the tissue of the beef being loosened nor the fatty substance being added.

The simulated corned beef according to the present invention substantially corresponds to an analog of the first mentioned corned beef.

As is well known to those skilled in the art, the manufacture of a corned beef is complicated and time-consuming. By way of example, during dressing of a livestock meat, for example beef, removal of bones, muscular membranes, tendons, excessive fat and blood vessels is required. Moreover, the curing of the livestock meat usually takes three to five days even when loosened texture fibers of the meat are employed as a principal component of the product.

In addition, time-consuming preparation and blending of chemical substances to provide a definite curing agent or a pickling solution, maintenance of the curing temperature and over-hauling of the meat being cured are also required. Furthermore, subsequent to packing and sterilization of the corned beef, it is a customary practice to shake the can to avoid the possibility of fat being locally biased as the meat packed within the can cools. Even though this shaking operation is performed, the amount of fat that can be added to the meat is limited to up to 20% relative to the weight of the meat used or 15% relative to the total weight of the corned beef product. The addition of the fat in an amount in slight excess of 20% of the weight of the meat used may not result in deterioration of the pleasing taste and mouthfeel of the corned beef, but the corned beef, when removed out of the can, would be unpleasant in appearance because of the presence of the fat biased in the meat.

In terms of economy, since a substantial amount of drip tends to be produced during the boiling of the meat, the yield of the corned beef product relative to the raw meat tends to be limited to about 60% and, therefore, the corned beef product is expensive as compared with most other meat products.

In view of the above described complications and drawbacks involved in the manufacture of the corned beef, the use of an inexpensive meat-like protein product, hereinafter referred to as a meat analog, has been tried. In most cases, however, the meat analog is used as a meat extender for extending an animal meat, such as beef or a mixture of two or more of beef, lamb, pork and horse meat, which is used as a principal component of the corned beef. The use of the meat analog does not contribute to quality improvement of the corned beef. By way of example, where spun fibers manufactured by the known wet spinning process such as disclosed in the U.S. Pat. No. 2,730,447 are employed as a meat analog, care is required to entangle the spun fibers with isolated texture fibers of the meat since they are inherently incapable of providing a meat-like sensation similar to that provided by the isolated texture fibers of the meat. For effecting entanglement of the spun fibers with the texture of the livestock meat, the material, i.e., the spun fibers and the livestock meat, is, after having been cured for a substantial period of time, ground to allow actomyosin to be extracted from the livestock meat and, then, by the utilization of a binding power exhibited by the actomyosin, the spun fibers are allowed to be entangled with the texture of the livestock meat. Mere mixing of the spun fibers with the livestock meat does not provide a sufficient entanglement of the spun fibers with the texture of the livestock meat.

Moreover, since each of the spun fibers lacks a fibril, which is one of the minute fibrous elements making up such fiber, a fat holding capability is limited and, therefore, the resultant corned beef mixed with the meat analog is such that fat is locally biased.

In an attempt to provide an inexpensive corned beef product, we have previously developed a simulated corned beef mixed with a fibrous soy protein product of fibril structure having a random orientation, which fibrous soy protein product is hereinafter referred to as fibrillated protein fibers. Our prior invention described above was assigned to the same assignee of the present invention, and is disclosed in a patent application filed in Japan on June 17, 1975 under No. 50-74001 and laid open to public inspection on January 12, 1977 under Publication No. 52-3852. According to our prior invention, the simulated corned beef is manufactured by treating the fibrillated protein fibers by adjusting the water content thereof to about 70%, the pH value within the range of 5.0 to 6.5 and the length thereof to 5 to 30 mm., adding a seasoning agent to the treated fibrillated protein fibers, simultaneously heating and stirring the treated fibrillated protein fibers until the water content thereof becomes 50 to 65%, mixing with the heated fibrillated protein fibers an emulsion comprising a fat or water, a proteinaceous material and fat and oil, with or without the addition of loosened fibers of a livestock meat, and packing into a casing and sterilizing the resultant mixture. In our prior invention, a seasoning agent, a flavoring agent and a coloring agent are applied to the fibrillated protein fibers separately of the emulsion.

The simulated corned beef of our prior invention is satisfactory in many aspects as compared with the conventional simulated corned beef comprising a mixture of spun protein fibers and an animal meat such as beef, pork or horse meat. However, since the various seasoning, flavoring and coloring agents are added separately of the emulsion, the manufacture thereof is somewhat time-consuming and care is required to provide simulated corned beef products which are manufactured at different times by the use of different batches of emulsion, but which can give a uniform taste and appearance attributable to some or all of the seasoning, flavoring and coloring agents.

SUMMARY OF THE INVENTION

Accordingly, the present invention is directed to an improvement in our prior method of manufacturing the simulated corned beef, wherein seasoning, flavoring and coloring agents are added to the emulsion prior to the latter being mixed with the fibrillated protein fibers.

Even in the present invention, the fibrillated protein fibers are employed as a starting material. The fibrillated protein fibers, that is, the fibrous soy protein product of fibril structure having a random orientation, are manufactured by heating a slurry of proteinaceous material, of which the pH value has been adjusted to about the isoelectric point of the proteinaceous material, under a high pressure to produce elongated tender protein filaments or fibers and then extruding the slurry-containing these filaments or fibers through an orifice to remove the tender protein filaments or fibers from the protein slurry. The tender protein filaments so produced are referred to as the fibrillated protein fibers in the description and the appended claims of the present invention because microscopic observation by the use of a known scanning electron microscope has shown that each tender protein filament or fiber is an aggregation of small, slender fibrous elements of different diameter having a substantially nappy outer surface, in contrast to the spun protein product or fiber which has a substantially uniform diameter over the entire length thereof and a substantially smooth outer surface. In any event, the method of manufacturing the fibrillated protein fibers and the requisite materials for the manufacture of the fibrillated protein fibers are disclosed in any one of the U.S. Pat. No. to Frederiksen et al., No. 3,662,671, and the U.S. Pat. No. to Hoer, No. 3,662,672, both patented on May 16, 1972, and, therefore, the details are not herein discussed because such fibrillated protein product is not an inventive feature of the present invention.

It is to be noted that, where the spun protein fibers are employed in place of the fibrillated protein fibers, the resultant simulated corned beef would fail to provide a pleasing taste and mouth-feel similar to that afforded by the genuine corned beef because the spun protein fibers are uniform and homogeneous in texture. Moreover, because of an undiversified surface appearance, the spun protein fibers can hardly be entangled with the loosened texture fibers of the animal meat and, therefore, will not ultimately give a mouth-feel comparable with that given by the loosened texture fibers of the meat, even though the fibers are usually bundled into a tow by the use of a binder such as albumin to ultimately give a meat-like sensation to the mouth. In any event, even though the spun protein fibers are more or less entangled with the loosened texture fibers of the animal meat, the resultant simulated corned beef would not provide the pleasing taste and mouth-feel similar to that afforded by the genuine corned beef.

DETAILED DESCRIPTION OF THE INVENTION

In the present invention, the fibrillated protein fibers are employed as a starting material as hereinbefore described. This is because the texture of the fibrillated protein fibers has been found sufficient and effective to exhibit a relatively high fat holding capacity and a high absorbability to an emulsion of the composition as will be described later. Because of this, not only can biases of the fat and oil be avoided in the resultant simulated corned beef, but also a relatively increased amount of fat and oil can be used. Moreover, the use of the fibrillated protein fibers substantially eliminates the necessity of the curing process and the extraction of actomyosin from the livestock meat which are heretofore required as described.

When the fibrillated protein fibers are to be used in the manufacture of the simulated corned beef according to the present invention, they are preferably cut to an average length of 5 to 30 mm. prior to their being mixed with the emulsion. If the average length is less than the lowermost limit of 5 mm., the fibrillated protein fibers employed will fail to provide a mouth-feel similar to that afforded by the isolated texture fibers of the livestock meat. On the other hand, if the average length exceeds the uppermost limit of 30 mm., the fibrillated protein fibers tend to form doughs or dumplings when mixed with the emulsion.

With respect to seasoning, flavoring and coloring agents, they are mixed in the emulsion prior to the latter being mixed with the fibrillated protein fibers. Since the amount of any one of the seasoning, flavoring and coloring agents, which are generally employed in the simulated corned beef, and the water content of the simulated corned beef, are relatively small as compared with a tsukudani, a Japanese preserved food boiled down in soy sauce, mere addition of these agents directly to the fibrillated protein fibers separately of the emulsion can hardly give a uniform taste and color in the ultimately available simulated corned beef unless the mixture of the fibrillated protein fibers with the agents is adjusted to a water content of 70%, with the agents being sufficiently impregnated into the fibrillated protein fibers, and subsequently heated at 80° to 100° C., while it is stirred simultaneously, for a period of time required for the water content thereof to attain a value within the range of 50 to 65%. This is true even though the mixture is, prior to being packed into a casing such as a can or any suitable container, heated for sterilization.

Since the seasoning, flavoring and coloring agents are mixed in the emulsion according to the present invention, no water content adjustment, which will otherwise be required by adding extra water and then stirring and heating, is necessary and, moreover, no care is required, such as heretofore required by the use of a double-bottomed heating vessel, to avoid the possibility of scorching of the material. This is because, in the present invention, the taste and flavor respectively given by the seasoning and flavoring agents can sink into the fibrillated protein fibers during the subsequent heating for the purpose of sterilization of the mixture of the fibrillated protein fibers with the emulsion.

The seasoning and flavoring agents, which may be employed in the present invention, may include those generally employed in the manufacture of the conventional simulated corned beef or the genuine corned beef, such as white pepper, allspice, sodium glutamate, sugar, onion powder, gravy, amino acid and others. Likewise, the coloring agent which may be employed in the present invention may include those generally employed in the manufacture of food products for human consumption.

When these seasoning, flavoring and coloring agents are to be mixed in the emulsion, a pH controller for adjusting the pH value of the fibrillated protein fibers to a value within the range of 5.0 to 6.5 is preferably added. It is to be noted that, if the pH value of the fibrillated protein fibers is less than 5.0, the resultant simulated corned beef will become acidic and, on the other hand, if it is more than 6.5, the resultant simulated corned beef, when canned and subsequently sterilized at elevated temperature, tends to become excessively tender.

The emulsion employed in the present invention consists of water and fat and oil with the addition of an emulsifier. The emulsifier may include a surfactant, such as fatty acid monoglyceride or sucrose fatty acid ester, and a proteinaceous material such as soy protein, peanut protein or casein. However, the employment of the proteinaceous material as the emulsifier is preferred, rather than the surfactant, because not only can oil be used, but also the hardness of the resultant simulated corned beef can readily be adjusted. Moreover, in view of the fact that the proteinaceous material can readily be heat-modified, the employment of the proteinaceous material as the emulsifier is advantageous in minimizing the possibility of the fat material being locally biased in the resultant simulated corned beef.

The amount of the oil and fat contained in the emulsion is selected to be 30 to 70, preferably, 40 to 60, percent by weight relative to the total weight of the emulsion, while the amount of the proteinaceous material is selected to be within the range of 4 to 14, preferably, 5 to 10, percent by weight relative to the total weight of the emulsion. If the respective amounts of the fat and oil and the proteinaceous material are more than 70 wt% and less than 4 wt%, sufficient emulsification cannot be attained. On the other hand, if the amount of the fat and oil is less than 30 wt%, the resultant simulated corned beef will not give a desired taste similar to that afforded by the genuine corned beef and, if the amount of the proteinaceous material is more than 14 wt%, the resultant simulated corned beef will become stiff upon being heated for sterilization.

While in the conventional corned beef product the amount of the fat and oil that can be added is limited to 15% relative to the total weight of the resultant corned beef as hereinbefore described, or otherwise the fat tends to be biased locally, such bias of the fat will not occur in the simulated corned beef product of the present invention even though the resultant simulated corned beef according to the present invention contains the emulsion in an amount corresponding to 70 wt% relative to the total weight thereof. Moreover, according to the present invention, since the fat and oil is added in the form of the emulsion to the fibrillated protein fibers, a pleasant taste, not too pasty, can be obtained in the resultant simulated corned beef.

It is to be noted that mixing of the seasoning, flavoring and coloring agents with the emulsion of the composition as described above may be performed either during or after the preparation of the emulsion. In particular, if these agents are mixed after the preparation of the emulsion, the mixture must be subsequently homogenized by stirring.

Subsequent to the preparation of the emulsion as described above, the emulsion is mixed with the fibrillated protein fibers, the amount of the emulsion being 30 to 70 wt% relative to the total weight of the mixture. If the amount thereof is less than 30 wt%, the emulsion will be absorbed by a portion of the fibrillated protein fibers because of the nature of the fibrillated protein fibers and, therefore, the taste and color of the seasoning, flavoring and coloring agents contained in the emulsion cannot be uniformly distributed in the fibrillated protein fibers during the subsequent heating or sterilization and, moreover, improvement cannot be attained in properly and adequately reducing the intrinsic stiffness of the fibrillated protein fibers. On the other hand, if the amount of the emulsion used is more than 70 wt%, not only will the resultant simulated corned beef present such an appearance as if the fibrillated protein fibers are loosely distributed in the emulsion, but also the taste and mouth-feel of the emulsion will dominate those of the fibrillated protein fibers, thereby resulting in the simulated corned beef lacking a pleasant taste and mouth-feel similar to that afforded by the genuine corned beef.

If desired, loosened texture fibers of a livestock meat, such as one or a mixture of beef, pork and horse meat, may be employed. These loosened texture fibers of the livestock meat, if employed, should be added during mixing of the emulsion with the fibrillated protein fibers, the maximum permissible amount of which must satisfy the following formulas. It is to be noted that, where the loosened texture fibers of the livestock meat are employed, the amount of the emulsion to be employed is also determined by the following formulas.

$$0.3 \leq E/(E+F) \leq 0.7$$

$$E/(E+M) < 0.4$$

wherein E, F and M respectively represent the amount of the emulsion, the amount of the fibrillated protein fibers and the amount of the loosened texture fibers of the livestock meat. The foregoing formulas are intended to mean that, if the quotient of the amount of the emulsion divided by the sum of the respective amounts of the emulsion and the fibrillated protein fibers is within the range of 0.3 to 0.7, the amount of the loosened texture fibers of the livestock meat to be employed must be of such a value that the quotient of the amount of the emulsion divided by the sum of the amounts of the emulsion and the livestock meat is less than 0.4. The loosened texture fibers of the livestock meat referred to above can be obtained merely by boiling the livestock meat for a substantial period of time, in a substantially similar manner as experienced in making a stewed beef which is usually loosened to pieces as the heating is prolonged.

Finally, the mixture of the emulsion and the fibrillated protein fibers with or without the addition of the loosened texture fibers of the livestock meat is packed into a casing, such as a can or any suitable container and, subsequently, sterilized at elevated temperature to provide the simulated corned beef product.

The present invention will now be described by way of examples which are for the purpose of illustration and, therefore, not limiting the present invention.

EXAMPLE I 40 parts of fibrillated protein fibers, manufactured and sold by Fuji Oil Co., Ltd., Japan, under a trade name of "FUJIPUR SP-90" (a frozen product), were cut so that the fibers had lengths of about 15 mm. The water content thereof was 65%. These fibrillated protein fibers were mixed with the emulsion of the following composition.

| | |
|---|---|
| Water | 25 parts |
| Isolated soy protein* | 3.5 parts |

-continued

| | |
|---|---|
| Beef fat | 25 parts |

*Manufactured and sold by Fuji Oil Co., Ltd. under a trade name "FUJIPRO-R".

During the manufacture of the emulsion of the above composition, 0.3 part of pH controller (Sodium Carbonate), 4.5 parts of seasoning agent including sodium glutamate, various amino acids and sugar, 0.3 part of spices, such as white pepper and allspice, and a flavor and 1.4 parts of coloring agent were mixed with homogenized with the emulsion. The resultant mixture was then mixed with the fibrillated protein fibers and packed into a can of 195.2 c.c. in volume. The canned mixture was heated at 112° C. for 60 minutes. No shaking of the can was performed subsequent to the heating.

The canned simulated corned beef so manufactured was, when the can was opened, found satisfactory. No bias of the fat component was found. In addition, it not only provided a pleasant taste and mouth-feel, but also the taste and the color were uniformly distributed.

EXAMPLE II

A homogenized emulsion consisting of 20 parts of water, 2.8 parts of FUJIPRO-R, 20 parts of beef fat, 0.2 part of $Na_2CO_3$, 3 parts of the seasoning agent, 0.3 part of the spice and 1.0 part of the coloring agent was mixed with 30 parts of loosened texture fibers of beef and 30 parts of FUJIPUR SP-90. The resultant mixture was canned in a can of 195.2 c.c. in volume and heated at 112° C. for 60 minutes. No shaking of the can was performed subsequent to the heating.

The canned simulated corned beef so manufactured was similar to that under Example I.

EXAMPLE III

A liquid mixture containing 20 parts of water and 8 parts of the same pH controller, seasoning agents, spices and coloring agent as under Example I was first prepared. This liquid mixture was then mixed with 18 parts of refined soybean oil and 4 parts of FUJIPRO-R to provide an emulsion. This emulsion was then mixed with 50 parts of FUJIPUR SP-90. The mixture of the emulsion with the fibrillated protein fibers was canned in a can of 195.2 c.c. in volume and heated at 112° C. for 60 minutes. No shaking of the can was performed subsequent to the heating.

The canned simulated corned beef so manufactured was similar to that under Example I.

However, it is to be noted that, when the fibrillated protein fibers under Example III were replaced by 50 parts of loosened texture fibers of beef, the resultant canned product was such that the corned beef was pasty and failed to provide a pleasant taste and mouth-feel.

Although the present invention has been described by way of examples, it is to be noted that various changes and modifications are apparent to those skilled in the art, such changes and modifications to be understood as included within the scope of the present invention unless they depart therefrom.

What we claim is:

1. A method of manufacturing a simulated corned beef product, which comprises:

mixing fibrillated protein fibers, having an average length of 5 to 30 mm, with a mixture of an emulsion, a seasoning agent, a flavoring agent, a spice and a coloring agent; said fibrillated protein fibers having a pH of 5–6.5 after said mixing and being prepared by heating a slurry of proteinaceous material, of which the pH value has been adjusted to about the isoelectric point of the proteinaceous material, under sufficient high pressure to produce elongated tender protein filaments or fibers, and then extruding the slurry containing said filaments or fibers through an orifice to remove the filaments or fibers from the protein slurry, which filaments or fibers are employed as said fibrillated protein fibers; said emulsion consisting essentially of water, fat and oil in a total amount within the range of 30 to 70% by weight, and a proteinaceous material in an amount within the range of 4 to 14% by weight, the percentages by weight being based on the total weight of the emulsion; the amount of the emulsion being 30 to 70% by weight relative to the total weight of the mixture, filling a casing with the resultant mixture, which resultant mixture consists essentially of the fibrillated protein fibers, the emulsion, the seasoning agent, the flavoring agent, the spice and the coloring agent, and sterilizing the casing, with the resultant mixture therein, by heating.

2. A method as claimed in claim 1, which further comprises adding loosened texture fibers of a livestock meat during said mixing.

3. A method as claimed in claim 2, wherein the amount of the emulsion and the amount of the loosened texture fibers of livestock meat satisfy the following conditions:

$$0.3 \leq E/(E+F) \leq 0.7$$

$$E/(E+M) < 0.4$$

wherein E, F and M respectively represent the amount of the emulsion, the amount of the fibrillated protein fibers and the amount of the loosened texture fibers of livestock meat.

* * * * *